(12) United States Patent
Yang et al.

(10) Patent No.: US 11,314,430 B2
(45) Date of Patent: Apr. 26, 2022

(54) READING DATA IN SUB-BLOCKS USING DATA STATE INFORMATION

(71) Applicant: EMC IP Holding Company LLC, Hopkinton, MA (US)

(72) Inventors: Lifeng Yang, Beijing (CN); Xiongcheng Li, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 13 days.

(21) Appl. No.: 16/656,832

(22) Filed: Oct. 18, 2019

(65) Prior Publication Data

US 2020/0133495 A1  Apr. 30, 2020

(30) Foreign Application Priority Data

Oct. 31, 2018  (CN) .......................... 201811286569.3

(51) Int. Cl.
*G06F 3/06* (2006.01)

(52) U.S. Cl.
CPC ............ *G06F 3/064* (2013.01); *G06F 3/0619* (2013.01); *G06F 3/0665* (2013.01); *G06F 3/0673* (2013.01)

(58) Field of Classification Search
CPC ...... G06F 3/064; G06F 3/0665; G06F 3/0673; G06F 3/0619
See application file for complete search history.

(56) References Cited

U.S. PATENT DOCUMENTS

| 8,954,383 | B1 | 2/2015 | Vempati et al. |
| 9,093,171 | B2 * | 7/2015 | Kim ....................... G11C 16/10 |
| 9,442,846 | B2 * | 9/2016 | Iyer ....................... G06F 3/0652 |
| 9,471,595 | B1 | 10/2016 | Vempati et al. |
| 9,852,061 | B2 * | 12/2017 | Lee ...................... G06F 12/0246 |
| 9,934,302 | B1 | 4/2018 | Cohen et al. |
| 10,042,573 | B2 * | 8/2018 | Iyer ......................... G06F 12/08 |
| 10,209,904 | B2 | 2/2019 | Himelstein et al. |
| 10,348,810 | B1 | 7/2019 | Florissi et al. |

(Continued)

OTHER PUBLICATIONS

Anonymous, "Understanding Flash: Blocks, Pages and Program/Erase", Jun. 20, 2014, pp. 1-5, https://flashdba.com/2014/06/20/understanding-flash-blocks-pages-and-program-erases/ (Year: 2014).*

(Continued)

*Primary Examiner* — Christopher D Birkhimer
(74) *Attorney, Agent, or Firm* — BainwoodHuang (57) ABSTRACT

Techniques read data. Such techniques involve: in response to receiving a read request from the user for data on a physical data block, determining whether there is data state information corresponding to the physical data block. The data state information may include a plurality of units for respectively indicating availability of data stored in a plurality of sub-blocks of the physical data block. Such techniques further involve: in response to determining that there is data state information, selecting a target sub-block from the plurality of sub-blocks of the physical storage block based on the data state information. Such techniques further involve: providing the user with data stored in the target sub-block. Such techniques are capable of determining the availability of data at a finer granularity.

9 Claims, 5 Drawing Sheets

(56) References Cited

U.S. PATENT DOCUMENTS

| | | | |
|---|---|---|---|
| 10,366,111 B1 | 7/2019 | Florissi et al. | |
| 10,404,787 B1 | 9/2019 | Florissi et al. | |
| 10,409,768 B2 | 9/2019 | Kuang et al. | |
| 10,496,926 B2 | 12/2019 | Florissi et al. | |
| 10,509,684 B2 | 12/2019 | Florissi et al. | |
| 10,515,097 B2 | 12/2019 | Florissi et al. | |
| 10,540,114 B2* | 1/2020 | Lv et al. | |
| 2004/0215908 A1* | 10/2004 | Zimmer | G06F 21/6209 711/163 |
| 2015/0363120 A1* | 12/2015 | Chen | G06F 3/0653 711/103 |
| 2016/0202927 A1* | 7/2016 | Klarakis | G06F 3/065 709/217 |
| 2016/0328170 A1* | 11/2016 | Iyer | G06F 12/08 |
| 2018/0189123 A1* | 7/2018 | Jeon | G11C 16/3495 |

OTHER PUBLICATIONS

Anonymous, "B-Trees", May 13, 2012, pp. 1-3, https://web.archive.org/web/20120513114248/https://www.cs.cornell.edu/courses/cs3110/2012sp/recitations/rec25-B-trees/rec25.html (Year: 2012).*

Daisy Tang, "CS241—Lecture Notes: B-Trees", Oct. 2012, pp. 1-8, https://www.cpp.edu/~ftang/courses/CS241/notes/b-tree.htm (Year: 2012).*

* cited by examiner

READING DATA IN SUB-BLOCKS USING DATA STATE INFORMATION

CROSS-REFERENCE TO RELATED APPLICATION

This application claims priority to Chinese Patent Application No. CN201811286569.3, on file at the China National Intellectual Property Administration (CNIPA), having a filing date of Oct. 31, 2018, and having "METHOD, ELECTRONIC DEVICE AND COMPUTER PROGRAM PRODUCT FOR READING DATA" as a title, the contents and teachings of which are herein incorporated by reference in their entirety.

FIELD

The present disclosure generally relates to the field of data reading/writing, and more specifically, to a method, electronic device and computer program product for reading data.

BACKGROUND

A log-structured storage system usually writes requests as modifications to a disk sequentially into a log-like structure. In the storage system, the log is the only structure on the disk, and it contains metadata for reading data. The log-structured storage system follows the principle of "ACID": Atomicity, Consistency, Isolation and Durability.

It should be appreciated that unavailability caused by data corruption is an inevitable problem in the storage system. There are many reasons for the unavailability, for example, bit rot, media error, parity checksum mismatch, or even unexpected system reboot. Since the log-structured storage system has a larger block size (for example, 4K bytes) for read/write operations, while the data error might only have a smaller size (for example, 1 byte), when the block needs to be read, the storage system will still return information that the data is unavailable. Therefore, the scope of data corruption will be amplified, which is an inherent problem of the log-structured storage system.

SUMMARY

Embodiments of the present disclosure provide a method, a device, and a computer program product for reading data.

In a first aspect of the present disclosure, there is provided a method for reading data. The method may include: in response to receiving a read request from the user for data on a physical data block, determining whether there is data state information corresponding to the physical data block. The data state information may includea plurality of units for respectively indicating availability of data stored in a plurality of sub-blocks of the physical data block. The method may further include: in response to determining that there is the data state information, selecting a target sub-block from the plurality of sub-blocks of the physical storage block based on the data state information. The method may further include: providing the user with data stored in the target sub-block.

In some embodiments, the method may further include: in response to determining that the data state information is absent, returning data read failure information.

In some embodiments, determining whether there is the data state information corresponding to the physical data block may include: determining a virtual entry for storing location information of the physical data block according to the read request; and detecting the data state information from the virtual entry.

In some embodiments, selecting the target sub-block from the plurality of sub-blocks of the physical storage block based on the data state information may include: determining, from the plurality of units of the data state information, a unit marked as available; and determining a sub-block corresponding to the determined unit as the target sub-block.

In some embodiments, the method may further include: deleting the data state information after providing the user with the data.

In some embodiments, the method may further include: in response to receiving a write request to write data to the physical data block, determining a sub-block of the physical data block to which the data is to be written; and marking, in the data state information, a unit corresponding to the determined sub-block as available.

In some embodiments, marking the unit corresponding to the determined sub-block as available may include: determining, from the data state information, the unit corresponding to the determined sub-block; and setting the determined unit to a predetermined value.

In a second aspect of the present disclosure, there is provided an electronic device. The device may include: at least one processing unit; and at least one memory coupled to the at least one processing unit and storing machine-executable instructions, the instructions, when executed by the at least one processing unit, causing the electronic device to perform acts, the acts including: in response to receiving a read request from the user for data on a physical data block, determining whether there is data state information corresponding to the physical data block, the data state information including a plurality of units for respectively indicating availability of data stored in a plurality of sub-blocks of the physical data block; in response to determining that there is the data state information, selecting a target sub-block from the plurality of sub-blocks of the physical storage block based on the data state information; and providing the user with data stored in the target sub-block.

In a third aspect of the present disclosure, there is provided a computer program product tangibly stored on a non-transient computer readable medium and including machine executable instructions which, when executed, cause a machine to perform steps of the method according to the first aspect.

This Summary is provided to introduce a selection of concepts that are further described below in the Detailed Description in a simplified form. This Summary is not intended to identify key features or essential features of the present disclosure, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference symbols usually refer to the same components.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in greater detail with reference to the drawings. Although the drawings present the preferred embodiments of the present disclosure, it should be understood that the present disclosure can be implemented in various ways and should not be limited by the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

B-Tree is always used as the data mapping on-disk structure in the log-structured storage system. The location information (metadata) of the data is usually stored in a virtual storage block and an indirect block of the B-tree. The location information describes a starting location of a physical data block for storing the data, and the size (or compressed size) of the data. In order to locate the physical data block for storing the data, it is usually necessary to obtain location information of an indirect block in the B-tree (e.g., a three-level B-tree includes a top indirect block, a middle indirect block, and a leaf indirect block) from a super block based on the user's read request. After the corresponding indirect block is found, the location information of the virtual storage block is obtained based on the information in the indirect block. The physical data block for storing the data may be located by using the location information stored in the virtual storage block.

It can be seen that in the log-structured storage system, a minimum space for storing data is a physical data block, and corresponding check mechanisms are also implemented based on the physical data block. Since the problem of unavailability of data inevitably occurs in the storage system, even if only a part of the physical data block is damaged, the entire physical data block is checked as unavailable. For example, if 1 bit data is unavailable in the 4K range, when the user reads other data in the 4K range, it will be reported that the data in this 4K range is unavailable. Therefore, the range of data corruption will be amplified.

Figure 1:
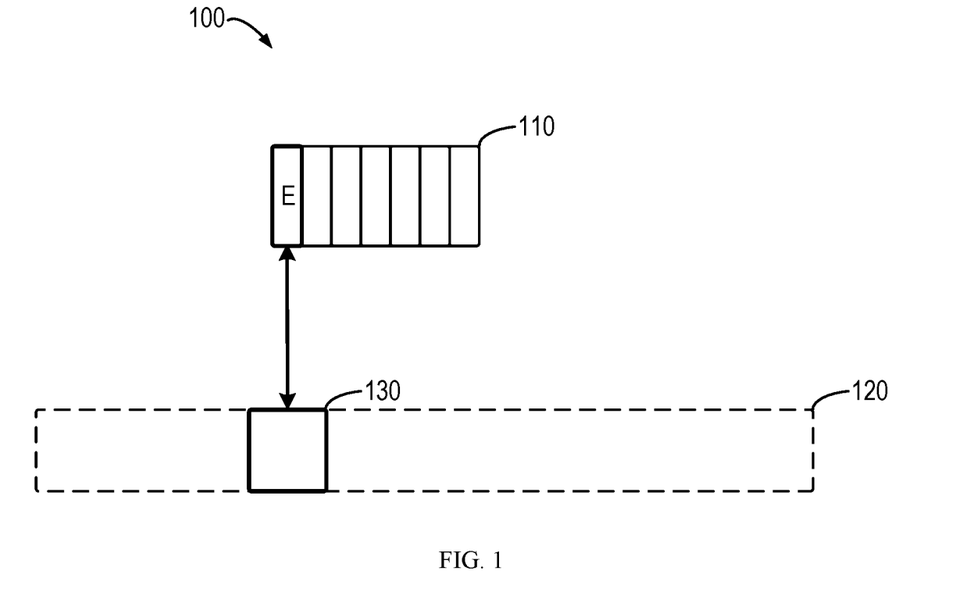
FIG. 1 illustrates a schematic diagram of a mapping relationship between a virtual storage block and a physical data block in a conventional log-structured storage system.

FIG. 1 illustrates a schematic diagram of a mapping relationship between a virtual storage block 110 and a physical data block 130 in a conventional log-structured storage system 100.

As shown in FIG. 1, there is a virtual storage block 110 in a virtual address space. Obviously, there are other plurality of virtual storage blocks (not shown) in the virtual address space. The virtual storage block 110 contains a plurality of virtual entries, such as, a virtual entry E. Each virtual entry stores location information (metadata) of a physical data block corresponding thereto, such as, a starting location and size of the physical data block. As shown in FIG. 1, the virtual entry E corresponds to the physical data block 130 so that the physical data block 130 can be found in physical address space 120. It should be appreciated that, for the sake of brevity, FIG. 1 only shows the virtual storage block 110 and the physical data block 130, and the multi-layer indirect blocks in the B-tree structure for storing the location information of the virtual storage block 110 are all the same as the conventional log-structured storage system, and therefore are not shown in FIG. 1. In addition, it should be appreciated that the virtual entry E only occupies a small space, and typically, a virtual storage block 110 may contain at least 200 virtual entries.

As described above, since the size of the physical data block 130 for performing read/write operations in the log-structured storage system is larger, when only a part of data in the physical data block 130 is unavailable, other available data in the physical data block 130 cannot be read either. Therefore, the range of data corruption is amplified.

In order to at least partially address the above and other potential problems and deficiencies, embodiments of the present disclosure provide a solution for reading data. With respect to the above problem, the solution for reading data in the present disclosure provides the following solutions of improvement: creating data state information in the virtual address space, so to indicate the availability of data stored in a plurality of sub-blocks in the physical data block 130.

Figure 2:
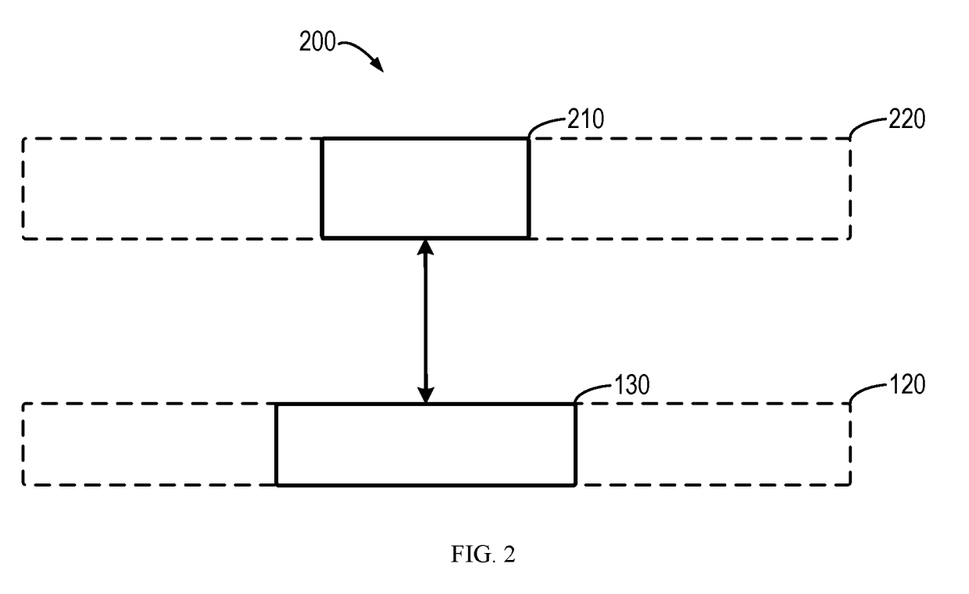
FIG. 2 illustrates a schematic diagram of a mapping relationship between data state information and physical data blocks in a log-structured storage system according to an embodiment of the present disclosure.

FIG. 2 illustrates a schematic diagram of a mapping relationship between data state information 210 and a physical data block 130 in a log-structured storage system according to an embodiment of the present disclosure. As shown in FIG. 2, the data state information 210 is created in the virtual address space 220, which corresponds to physical data block 130 in the physical address space 120 and is configured to indicate the availability of data stored in a plurality of sub-blocks in the physical data block 130. As an example, the data state information 210 may be a bitmap in which a plurality of bits corresponds to a plurality of sub-blocks of the physical data block 130, respectively. In this way, the availability information for each sub-block of the physical data block 130 may be detected. Alternatively or additionally, the data state information 210 may also be a state value matrix. A plurality of elements in the state value matrix respectively correspond to the plurality of sub-blocks of the physical data block 130, and dimensions of the plurality of sub-blocks are the same as the dimensions of the state value matrix. The data state information 210 will be described in detail below as an embodiment of the bitmap with reference to FIG. 3.

Figure 3:
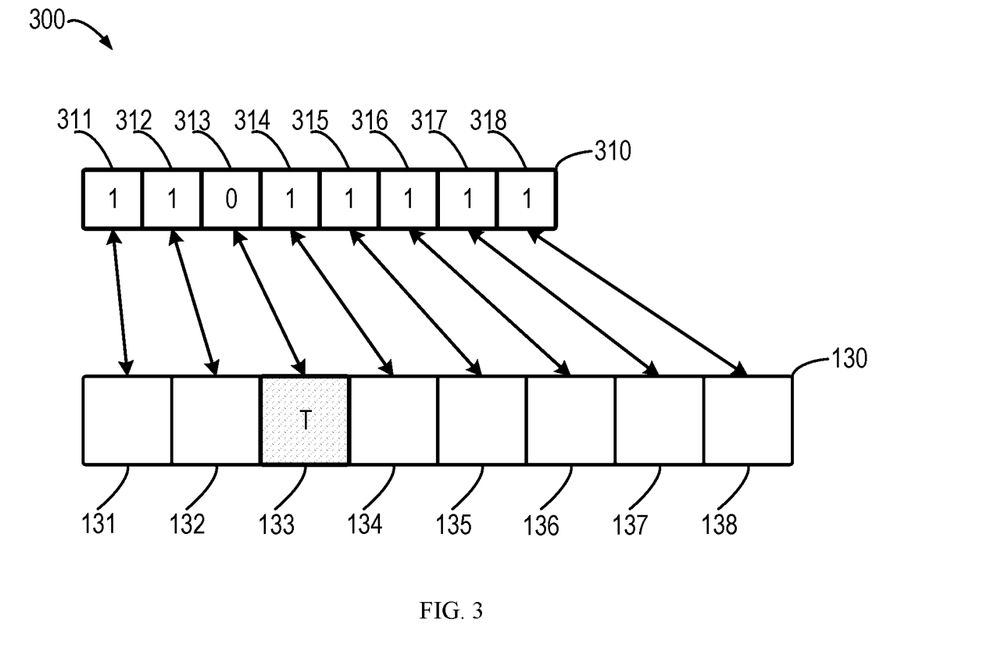
FIG. 3 illustrates a schematic diagram of a mapping relationship between data state information and a physical data block in a log-structured storage system according to an embodiment of the present disclosure.

FIG. 3 illustrates a schematic diagram of a mapping relationship between a bitmap 310 and a physical data block 130 in a log-structured storage system 300 according to an embodiment of the present disclosure. As shown in FIG. 3, the bitmap 310 is created in a virtual address space and includes a plurality of units 311, 312, 313, 314, 315, 316, 317, and 318. As shown in FIG. 3, the plurality of units 311, 312, 313, 314, 315, 316, 317, and 318 respectively correspond to a plurality of sub-blocks 131, 132, 133, 134, 135, 136, 137, and 138 of the physical data block 130 in the physical address space, and are used to indicate the availability of data stored in the plurality of sub-blocks 131, 132, 133, 134, 135, 136, 137, and 138 in the physical data block 130. It should be understood that the number of units in the bitmap 310 is optional, and is not limited to eight as shown in FIG. 3. In this way, the availability information of each sub-block of the physical data block 130 will be detected. That is, embodiments of the present disclosure are capable of determining the availability of data at a finer granularity, avoiding the loss of available data. The detailed operation of reading data from the physical data block will be described in detail below.

Figure 4:
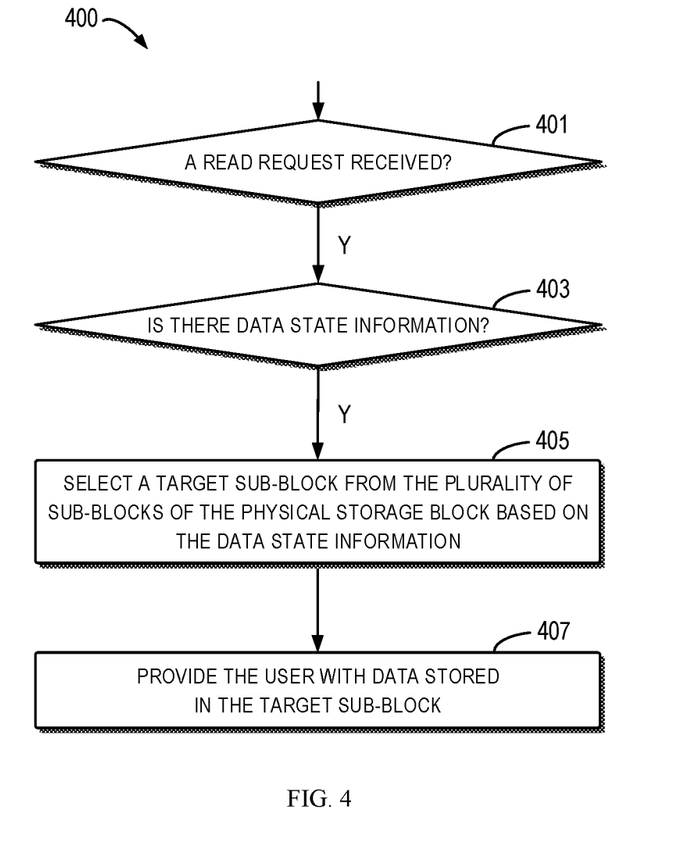
FIG. 4 illustrates a flow chart of a process or method for reading data according to an embodiment of the present disclosure.

FIG. 4 illustrates a flow chart of a process or method for reading data according to an embodiment of the present disclosure. In some embodiments, the method 400 may be implemented in an apparatus shown in FIG. 7. As an example, the method 400 may be implemented in the log-structured storage system 200 shown in FIG. 2 or the log-structured storage system 300 shown in FIG. 3. Reference is made now to FIG. 2-FIG. 3 to describe the process or method 400 for reading data in accordance with an embodiment of the present disclosure shown in FIG. 4. To facilitate understanding, specific data mentioned in the following description is by way of example and is not intended to limit the scope of the disclosure.

At 401, it is determined whether a read request from the user for data on the physical data block 130 is received. In some embodiments, the read request includes location information of the physical data block 130. In some embodiments, the read request includes location information of the virtual entry E in the virtual storage block 110. The virtual entry E includes location information of the physical data block 130. In some embodiments, when a B-tree is used as a data mapping on-disk structure in the log-structured storage system 300, the read request includes location information of an indirect block of the B-tree (e.g., a three-level B tree includes a top indirect block, a middle indirect block and a leaf indirect block), the indirect block includes location information of the virtual entry E in the virtual storage block 110, and the virtual entry E contains location information of the physical data block 130. As shown in FIG. 4, when it is determined that the read request from the user for data on the physical data block 130 is received, the process proceeds to 403.

At 403, it is determined whether there is data status information 210 corresponding to the physical data block. As shown in FIG.1-FIG. 3 and as described above, when it is determined that the read request from the user for data on the physical data block 130 is received, the location information of the virtual entry E in the virtual storage block 110 is obtained from the read request, and then it is detected in the virtual entry E whether there is data state information 210 corresponding to the physical data block. As an example, a bitmap 310 as the data state information is stored in the virtual entry E. Alternatively or additionally, the virtual entry E stores location information of the bitmap 310 in the virtual address space. Since only the location information of the bitmap 310 is stored in the virtual entry E, the space of the virtual entry may be saved, so that the virtual storage block 110 may include more virtual entries. As shown in FIG. 4, when it is determined that there is the data state information 210 corresponding to the physical data block, the process proceeds to 405.

At 405, a target sub-block is selected from the plurality of sub-blocks of the physical storage block 130 based on the data status information 210. As shown in FIG. 3, when the data state information 210 is the bitmap 310, the third bit from the left side of the bitmap 310 is "0", then the sub-block T corresponding to the "0" bit (i.e., sub-block 133 in FIG. 3) is the target sub-block. Alternatively or additionally, when the data state information 210 is the state value matrix, an element marked as a specific value in the state value matrix is obtained, and the sub-block T corresponding to the element in the physical storage block 130 is the target sub-block.

At 407, data stored in the target sub-block T is provided to the user. By implementing the above process, when a physical data block is checked to be unavailable, it is still possible to read data of an available portion of the physical data block, thereby preventing the range of data corruption from being amplified.

In some embodiments, the method 400 may further include: returning data read failure information when it is determined that data state information 210 is absent. As an example, a check result of the physical data block 130 may be first checked. When the physical data block 130 is displayed unavailable, it is possible to further determine whether the data status information 210 corresponding to the physical data block 130 presents in the virtual address space. That is, the data read failure information is returned only when it is determined that the physical data block 130 is unavailable and the data state information 210 is absent. When it is determined that the physical data block 130 is available, and it is determined that the physical data block 130 is unavailable but the data state information 210 is present, the read operation may continue.

In some embodiments, the method 400 may also include: in response to receiving a write request to write data to the physical data block 130, determining a sub-block of the physical data block 130 to which the data is to be written, and marking, in the data state information 210, a unit corresponding to the determined sub-block as available. As an example, as shown in FIG. 3, after the physical data block 130 is checked and marked as unavailable, a bitmap with each bit being "1" may be created, that is, each sub-block of the physical data blocks 130 may be marked as unavailable. When the physical data block 130 is overwritten again, it may be determined that the overwritten sub-blocks in the physical data block 130 all are available sub-blocks, so that bits corresponding to the overwritten sub-blocks in the bitmap 130 may be marked as available. In some embodiments, the starting location of the overwrite operation is not aligned with the starting position of each sub-block in the physical data block 130. In this case, it is possible to only mark bits, as available, in the bitmap 130 corresponding to sub-blocks in the range of location of the overwrite operation.

In some embodiments, marking the unit corresponding to the determined sub-block as available includes: determining, from the data state information 210, the unit corresponding to the determined sub-block, and setting the determined unit to a predetermined value. As an example, it is possible to determine, from the bitmap 310 as the data state information 210, a bit corresponding to the determined sub-block, and set the bit to "0".

In some embodiments, the method 400 may also include: deleting the data state information 210 after providing the user with the data.

By implementing the above process, the availability of data can be determined at a finer granularity, thereby alleviating or eliminating the negative impact due to the large granularity of data blocks inherent in the log-structured storage system.

Further, reference is made below to FIG. 2 to FIG. 3 to describe a process of determining whether there is data state information corresponding to the physical data block in detail.

Figure 5:
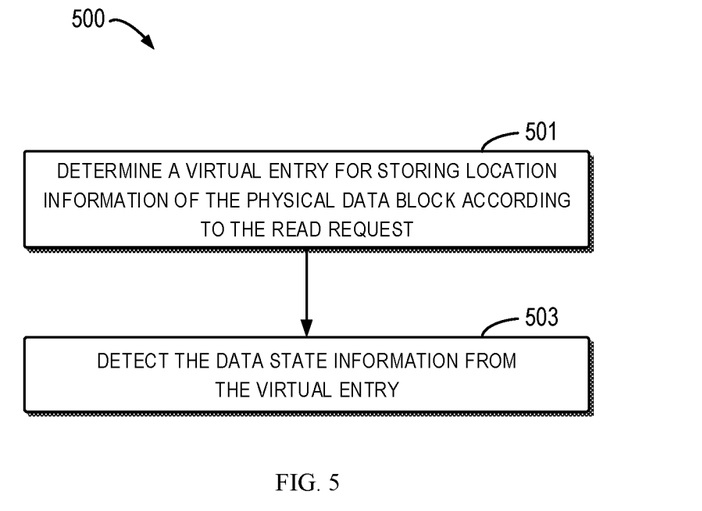
FIG. 5 illustrates a flow chart of a process or method for reading data according to an embodiment of the present disclosure.

FIG. 5 illustrates a flow chart of a process or method 500 for reading data according to an embodiment of the present disclosure, to describe the process of determining whether there is data state information corresponding to the physical data block in 403. In some embodiments, the method 500 may be implemented in an apparatus shown in FIG. 7. As an example, the method 500 may be implemented in the log-structured storage system 200 shown in FIG. 2 or the log-structured storage system 300 shown in FIG. 3. To facilitate understanding, specific data mentioned in the following description is by way of example and is not intended to limit the scope of the disclosure.

At 501, a virtual entry E for storing location information of the physical data block 130 is determined according to the read request. In some embodiments, the read request may include location information for a virtual entry E in the virtual memory block 110, and the virtual entry E may include location information of the physical data block 130. In some embodiments, when B-tree is used as a data mapping on-disk structure in the log-structured storage system 300, the read request may include location information of an indirect block of the B-tree (e.g., a three-level B tree includes a top indirect block, a middle indirect block and a leaf indirect block), the indirect block may include location information of the virtual entry E in the virtual storage block 110, and the virtual entry E may include location information of the physical data block 130. Through the above process, the location information of the physical data block in which the data is located may be obtained from the read request.

At 503, data state information is detected from the virtual entry E. As an example, a bitmap 310 as data state information is stored in the virtual entry E. Alternatively or additionally, location information of the bitmap 310 in the virtual address space is stored in the virtual entry E. Since only the location information of the bitmap 310 is stored in the virtual entry E, the space of the virtual entry may be saved, so that the virtual storage block 110 may be enabled to to include more virtual entries.

Further, reference is made below to FIG. 1 through FIG. 3 to describe a process of selecting a target sub-block from a plurality of sub-blocks of the physical storage block based on the data state information in detail.

Figure 6:
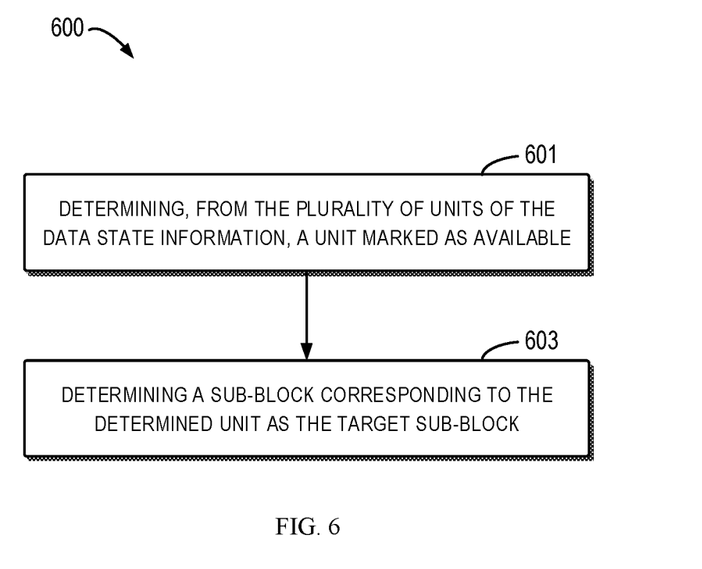
FIG. 6 illustrates a flow chart of a process or method for reading data according to an embodiment of the present disclosure.

FIG. 6 illustrates a flow chart of a process or method 600 for reading data according to an embodiment of the present disclosure, to describe the process of selecting a target sub-block from a plurality of sub-blocks of the physical storage block based on the data state information in 405. In some embodiments, the method 600 may be implemented in the apparatus shown in FIG. 7. As an example, the method 600 may be implemented in the log-structured storage system 200 shown in FIG. 2 or the log-structured storage system 300 shown in FIG. 3. To facilitate understanding, specific data mentioned in the following description is by way of example and is not intended to limit the scope of the disclosure.

At 601, a unit marked as available is determined from a plurality of units of data status information 210. In some embodiments, when the data state information 210 is the bitmap 310, the unit marked as available may be determined from a plurality of bits of the bitmap 310. As shown in FIG. 3, the third bit from the left side of the bitmap 310 is "0", it is determined that the bit is marked as available.

At 603, a sub-block corresponding to the determined unit is determined as the target sub-block.

Through the above process, it is possible to use the created data state information to respectively represent each sub-block in the physical data block, thereby marking the availability of data in the physical data block at a finer granularity.

Figure 7:
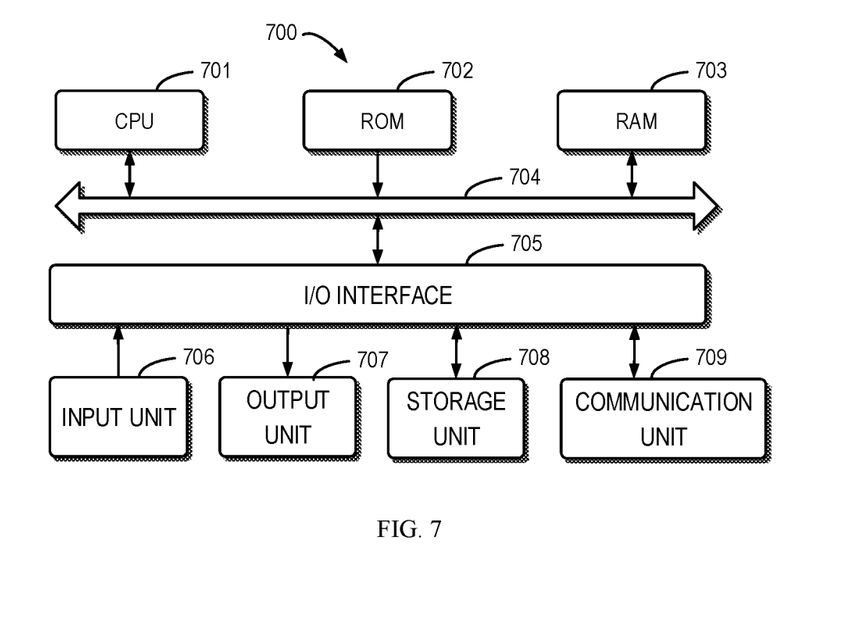
FIG. 7 illustrates a schematic block diagram of an apparatus for reading data according to an embodiment of the present disclosure.

FIG. 7 illustrates a schematic block diagram of an example device 700 that may be used to implement embodiments of the present disclosure. As illustrated, the device 700 includes a central processing unit (CPU) 701 which may perform various appropriate actions and processing according to the computer program instructions stored in a read-only memory (ROM) 702 or the computer program instructions loaded from a storage unit 708 into a random access memory (RAM) 703. The RAM 703 may also store all kinds of programs and data required by operating the storage device 700. CPU 701, ROM 702 and RAM 703 are connected to each other via a bus 704, to which an input/output (I/O) interface 705 is also connected.

A plurality of components in the device 700 are connected to the I/O interface 705, including: an input unit 706, such as keyboard, mouse and the like; an output unit 707, such as various types of display, loudspeakers and the like; a storage unit 708, such as magnetic disk, optical disk and the like; and a communication unit 709, such as network card, modem, wireless communication transceiver and the like. The communication unit 709 allows the device 700 to exchange information/data with other devices through computer networks such as Internet and/or various telecommunication networks.

Each procedure and processing described above, such as methods 400, 500 and/or 600, may be executed by a processing unit 701. As an example, in some embodiments, the methods 400, 500 and/or 600 may be implemented as computer software programs, which are tangibly included in a machine-readable medium, such as storage unit 708. In some embodiments, the computer program may be partially or completely loaded and/or installed to the device 700 via ROM 702 and/or the communication unit 709. When the computer program is loaded to RAM 703 and executed by CPU 701, one or more acts of the above described methods 400, 500 and/or 600 may be implemented.

The present disclosure may be a method, an apparatus, a system and/or a computer program product. The computer program product can include a computer-readable storage medium loaded with computer-readable program instructions thereon for executing various aspects of the present disclosure.

The computer readable storage medium may be a tangible device capable of holding and storing instructions used by an instruction execution device. The computer readable storage medium may be, but is not limited to, for example, electronic storage devices, magnetic storage devices, optical storage devices, electromagnetic storage devices, semiconductor storage devices, or any random appropriate combination thereof. More specific examples (non-exhaustive list) of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as a punched card storing instructions or an emboss within a groove, and any random suitable combination thereof. A computer readable storage medium used herein is not interpreted as a transitory signals per se, such as radio waves or other freely propagated electromagnetic waves, electromagnetic waves propagated through a waveguide or other transmission medium (e.g., optical pulses passing through fiber-optic cables), or electrical signals transmitted through electric wires.

The computer readable program instructions described herein may be downloaded from a computer readable storage medium to various computing/processing devices, or to external computers or external storage devices via a network, for example, the Internet, a local area network, a wide area network and/or a wireless network. The network may include copper transmission cables, optical fiber transmission, wireless transmission, routers, firewalls, switches, gateway computers and/or edge servers. The network adapter or network interface in each computing/processing device receives computer readable program instructions from the network and forwards the computer readable program instructions for storage in a computer readable storage medium of each computing/processing device.

Computer readable program instructions for executing the operations of the present disclosure may be assembly instructions, instructions of instruction set architecture (ISA), machine instructions, machine dependent instructions, microcode, firmware instructions, state setting data, or either source code or destination code written by any combination of one or more programming languages including object oriented programming languages, such as Smalltalk, C++ or the like, and conventional procedural programming languages, such as the "C" programming language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagrams of method, apparatus (systems), and computer program product according to embodiments of the present disclosure. It will be understood that each block in the flow chart and/or block diagrams, and any combinations of various blocks thereof may be implemented by computer readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may include a manufactured article that includes instructions for implementing various aspects of the functions/actions specified in one or more blocks of the flow chart and/or block diagram.

The computer readable program instructions may also be loaded into computers, other programmable data processing devices, or other devices, so as to execute a series of operational steps on the computer, other programmable data processing devices or other devices to generate a computer implemented process. Therefore, the instructions executed on the computer, other programmable data processing devices, or other device may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of reading data, comprising:
receiving a plurality of read requests from a user for data on respective physical data blocks, and, in response, performing a determination operation for each of the physical data blocks, the determination operation including, for any given physical data block:
  determining a virtual entry for storing location information of that given physical data block according to its read request by locating a virtual storage block within a B-tree; and
  detecting data state information from the virtual entry, including determining whether the virtual entry points to a bitmap that includes a plurality of units for respectively indicating availability of data stored in a plurality of sub-blocks of that given physical data block, the bitmap being separate from the located virtual storage block and separate from the given physical data block; and
determining that there is the data state information corresponding to a first physical data block for a first read request of the plurality of read requests, and, in response:
  selecting a target sub-block from the plurality of sub-blocks of the first physical data block based on the data state information corresponding to the first physical data block by:
    determining, from the plurality of units of the data state information corresponding to the first physical data block, a unit marked as available and
    determining a sub-block corresponding to the determined unit as the target sub-block;
  providing the user with data stored in the selected target sub-block; and
  deleting the data state information after providing the user with the data.

2. The method according to claim 1, further comprising:
determining that the data state information corresponding to a second physical data block for a second read request of the plurality of read requests is absent, and, in response, returning data read failure information.

3. The method according to claim 1, further comprising receiving a write request to write data to a second physical data block, and, in response:
  determining a sub-block of the second physical data block to which the data is to be written; and
  marking, in data state information corresponding to the second physical data block, a unit corresponding to the determined sub-block as available.

4. The method according to claim 3, wherein the marking the unit corresponding to the determined sub-block as available comprises:
  determining, from the data state information corresponding to the second physical data block, the unit corresponding to the determined sub-block; and
  setting the determined unit to a predetermined value.

5. An electronic device, comprising:
  at least one processing unit; and
  at least one memory coupled to the at least one processing unit and storing machine-executable instructions, the machine-executable instructions, when executed by the at least one processing unit, causing the electronic device to perform acts, the acts comprising:
  receiving a plurality of read requests from a user for data on respective physical data blocks, and, in response, performing a determination operation for each of the physical data blocks, the determination operation including, for any given physical data block:
    determining a virtual entry for storing location information of that given physical data block according to its read request by locating a virtual storage block within a B-tree; and
    detecting data state information from the virtual entry, including determining whether the virtual entry points to a bitmap that includes a plurality of units for respectively indicating availability of data stored in a plurality of sub-blocks of that given physical data block, the bitmap being separate from the located virtual storage block and separate from the given physical data block; and
  determining that there is the data state information corresponding to a first physical data block for a first read request of the plurality of read requests, and, in response:
    selecting a target sub-block from the plurality of sub-blocks of the first physical data block based on the data state information corresponding to the first physical data block by:
      determining, from the plurality of units of the data state information corresponding to the first physical data block, a unit marked as available and
      determining a sub-block corresponding to the determined unit as the target sub-block;
    providing the user with data stored in the selected target sub-block; and
    deleting the data state information after providing the user with the data.

6. The device according to claim 5, wherein the acts further comprise:
determining that the data state information corresponding to a second physical data block for a second read request of the plurality of read requests is absent, and, in response, returning data read failure information.

7. The device according to claim 5, wherein the acts further comprise receiving a write request to write data to a second physical data block, and, in response:
  determining a sub-block of the second physical data block to which the data is to be written; and
  marking, in data state information corresponding to the second physical data block, a unit corresponding to the determined sub-block as available.

8. The device according to claim 7, wherein the marking the unit corresponding to the determined sub-block as available comprises:
  determining, from the data state information corresponding to the second physical data block, the unit corresponding to the determined sub-block; and
  setting the determined unit to a predetermined value.

9. A computer program product having a non-transitory computer readable medium which stores a set of instructions to read data; the set of instructions, when carried out by computerized circuitry, causing the computerized circuitry to perform a method of:
  receiving a plurality of read requests from a user for data on respective physical data blocks, and, in response, performing a determination operation for each of the physical data blocks, the determination operation including, for any given physical data block:
  determining a virtual entry for storing location information of that given physical data block according to its read request by locating a virtual storage block within a B-tree; and
  detecting data state information from the virtual entry, including determining whether the virtual entry points to a bitmap that includes a plurality of units for respectively indicating availability of data stored in a plurality of sub-blocks of that given physical data block, the bitmap being separate from the located virtual storage block and separate from the given physical data block;
determining that there is the data state information corresponding to a first physical data block for a first read request of the plurality of read requests, and, in response:
  selecting a target sub-block from the plurality of sub-blocks of the first physical data block based on the data state information corresponding to the first physical data block by:
    determining, from the plurality of units of the data state information corresponding to the first physical data block, a unit marked as available and
    determining a sub-block corresponding to the determined unit as the target sub-block;
  providing the user with data stored in the selected target sub-block; and
  deleting the data state information after providing the user with the data.

* * * * *